United States Patent [19]

Brachman et al.

[11] 3,887,477

[45] June 3, 1975

[54] ALKYL PHENOL-HYDRAZINE ANTIOXIDANTS

[75] Inventors: Armand Edward Brachman, Allentown; Edward Michael McCarron, Easton, both of Pa.

[73] Assignee: GAF Corporation, New York, N.Y.

[22] Filed: May 23, 1972

[21] Appl. No.: 282,910

[52] U.S. Cl. ............. 252/400 R; 252/404; 252/401; 260/624 A; 260/45.9 R; 426/182; 426/269; 426/328
[51] Int. Cl. ............................................ C08f 45/58
[58] Field of Search ........ 252/401, 404, 405, 400 R; 260/624 A, 45.9 R; 426/182, 184, 269, 328

[56] References Cited
UNITED STATES PATENTS

| | | | |
|---|---|---|---|
| 2,476,554 | 7/1949 | Lincoln et al. | 260/624 A |
| 3,424,712 | 1/1969 | Gottlieb et al. | 252/404 X |
| 3,462,392 | 8/1969 | Kaplan | 252/404 X |
| 3,487,044 | 12/1969 | Tholstrup | 252/404 X |
| 3,629,111 | 12/1971 | Cramer | 252/404 X |
| 3,644,282 | 2/1972 | Bresson | 252/404 X |
| 3,655,779 | 4/1972 | Shelton | 252/404 X |
| 3,746,654 | 7/1973 | Cottman | 252/404 X |

*Primary Examiner*—Benjamin R. Padgett
*Assistant Examiner*—Irwin Gluck
*Attorney, Agent, or Firm*—W. C. Kehm

[57] ABSTRACT

Composition particularly adapted to stabilize polymeric organic materials such as α-olefin polymers and copolymers against the deleterious effects of oxygen, heat and light comprising a mixture of 2,6-ditertiarybutyl-4-nonylphenol and hydrazine and the resultant stabilized materials.

8 Claims, No Drawings

ALKYL PHENOL-HYDRAZINE ANTIOXIDANTS

This invention relates to compositions effective as stabilizers for organic materials such as α-olefin polymers and copolymers against the deleterious effects of oxygen, heat and light, and more particularly the invention relates to the stabilization of hindered phenolic compounds against color formation and the use of such stabilized hindered phenolic compounds for stabilizing polymeric organic materials.

The ability of the hindered phenolic compounds to stabilize materials against oxidative degradation is widely recognized. Thus, it is known in the prior art that various hindered phenols such as 2,6-ditertiarybutyl-4-methyl phenol will retard oxidative degration of plastics such as polypropylene. A higher aliphatic substituent than the methyl group would be preferable in order to decrease volatility and improve compatibility provided that the stabilizer itself does not discolor the resultant system.

It has already been proposed that 2,6-ditertiarybutyl-4-nonylphenol be used as an antioxidant to stabilize and prolong the life of various plastics and oil compositions. However, its use has been restricted to those applications where the deep, brown-red color associated with this alkyl phenol is not a deterring factor. This relatively inexpensive, appreciably less volatile effective antioxidant would have a greater utility if its inherent color can be eliminated.

In accordance with the invention, it has now been found that hydrazine can be effectively utilized to prevent color formation in hindered phenols and/or to decolorize, i.e., purify hindered phenols. The resultant combination of hindered phenols and hydrazine is in turn an effective stabilizer for organic materials which are subject to oxidative and thermal or photochemical degradation. The combination of hindered phenol and hydrazine possess low volatility, are non-staining and are extremely effective protective agents for organic polymeric materials both natural and synthetic. The compositions comprising a hindered phenol and hydrazine or hydrazine hydrate are especially useful as stabilizers for alpha-monoolefin homopolymers and copolymers, particularly polyethylene, polypropylene, polypropylene and ethylene and propylene copolymers and terpolymers, polyacetal homopolymers and copolymers, polyamides, polyamides, polyesters, polyurethanes, styrene polyester compositions, natural rubber, acrylonitrile-butadiene-styrene compositions, butadiene-styrene compositions, ethylene-vinyl acetate compositions, lubricating oils, etc.

In accordance with a preferred embodiment of the invention, it has been found that the addition of a diester of β-thiodipropionate acid such as dilauroylthiodipropionate acts to syngergistically increase the effectiveness of the hydrazine or hydrazine hydrate and alkyl phenol as a stabilizer for organic material.

The hindered phenol which can be stabilized against color formation or purified by incorporating therein hydrazine or hydrazine hydrate is characterized by the following structure:

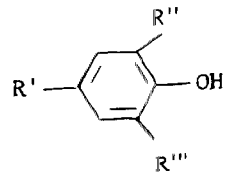

wherein R' is an aliphatic group containing from 1 to 24 carbon atoms or an aliphatic aryl group such as,

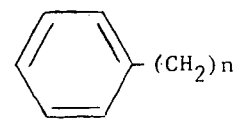

wherein n has a value of from 1 to 10, R'' is t-butyl, t-amyl, isopropyl or other aliphatic group and R''' is the same as R' or methyl, ethyl, propyl, butyl, amyl or hydrogen.

The above phenols can be mixed with from 0.1 to 5 percent by weight of hydrazine or hydrazine hydrate and the resultant compositions stored for over a year at ambient temperature in clear bottles without showing any evidence of color development. If necessary or desired, before using the phenol the same can be subjected to distillation.

For decolorizing a hindered phenol 0.5 to 5 percent by weight of hydrazine or hydrazine hydrate can be added to the hindered phenol. When amounts at the lower end of the indicated range are used, periods of time of up to several days are required to effect the decolorizing.

If amounts of 1 percent or more of the hydrazine or hydrazine hydrate are employed, as little as 10 minutes at room temperature is all that is required. The presence of water in the hydrazine hydrate acts to cloud the resultant colorized product but the product can be rendered clear by "topping" off the water. For subsequent use as a stabilizer for an organic material such as a polymer, the phenol can be combined with 0.1 to 25 percent hydrazine, 0.5 to 1 percent being preferred. Using the conventional amount of phenolic stabilizer, 1 percent or less, the amount of hydrazine incorporated into the plastic is, of course, very small.

The amount of stabilizer composition employed for stabilizing the organic material will vary to some extent with the particular material to be stabilized and also with the particular phenol employed. As noted above, however, for effective stabilization of most organic materials an amount of hydrazine or hydrazine hydrate of about 0.001 to about 0.5 percent by weight based on the weight of the organic material will be employed. In most applications, the amount of the stabilizer composition (hydrazine or hydrazine hydrate and alkyl phenol) will vary between about 0.01 to about 5 percent by weight. With the poly-(alpha-monoolefin) homopolymers and copolymers about 0.01 to about 1.5 percent by weight of the stabilizer composition based on the weight of the polymer will be employed. Certain of the hindered phenols will be more useful in some applications than others. This is attributable at least in part to the compatibility of the particular phenol with the organic material to be stabilized as a result of varying the alkyl substituent and their position on the phenol ring.

The compositions of this invention are readily incorporated into most organic materials and require no special processing. Conventional methods of incorporation have been generally found to be adequate. For example, the stabilizer composition of the invention can be incorporated into the polymers by mixing on a rubber mill or in a Banbury mixer or they may be added along with a suitable solvent or master batch with other ingredients to a solution or dispersion of the polymer. The solubility of the present compositions in a wide variety or organic solvents facilitates their use in solution and also renders them compatible with most oils and lubricants.

The hindered phenol-hydrazine compositions are compatible with conventional compounding ingredients such as processing oils, plasticizers, lubricants, anti-sticking agents, fillers, reinforcing agents, sulfur and other curing agents, accelerators, anti-foaming agents, rust inhibitors and the like. They are also compatible with other non-antioxidants, antiozonants, color and heat stabilizers, ultra-violet absorbers and the like.

When employed in combination with certain of the known stabilizers, a synergistic effect will be produced. Synergism results, for example, when the phenol and hydrazine compositions are combined with diesters of β-thiodipropionate acid having the formula ROOCCH$_2$CH$_2$—S—CH$_2$CH$_2$COOR wherein R is an alkyl group containing from 6–20 carbons atoms such as octyl, decyl, lauryl, cetyl, stearyl, palmityl, benzyl, cyclohexyl and the like. An especially marked synergistic effect is obtained when 2,6-ditertiarybutyl-4-nonylphenol, hydrazine and dilaurylthiodipropionate are combined. Typically, the amount of β-dialkylpropionate employed will be varied between about one part and five parts per part of the phenol in order to achieve optimum synergistic activity.

The compositions of the invention are extremely useful stabilizers. They are useful in a wide variety of organic materials to prevent oxidative thermal or photochemical materials.

Organic materials which are stabilized in accordance with the present invention include both natural and synthetic polymers. The compositions of the invention particularly the synergistic compositions are advantageously employed for the stabilization of homopolymers of ethylene, propylene, butene-1, isobutylene, pentene-1, hexene-1, 4-methylpentene-1, and the like, or copolymers thereof such as ethylene-propylene copolymer, ethylene-butene-1 copolymer, 4-methyl-1-pentene-hexene-1 copolymer and the like; ethylene-propylene-diene rubbers wherein the diene is 1,4-hexadiene, 2-methyl-1,4-hexadiene, dimethyl-1,4,9-decatrienes, dicyclopentadiene, vinylcyclohexene, vinyl norbornene, ethylidene norbornene, methylene norbornene, norbornadiene, methyl norbornadiene, methyl tetrahydroindene and the like; polyacetal resins, such as acetal homopolymers derived from the polymerization of formaldehyde or acetal copolymers derived from trioxane, polyesters obtained by the condensation of saturated or unsaturated anhydrides or dibasic acids, such as maleic, fumaric, itoconic or terephthalic anhydrides or fumaric, adipic, azelaic, sebacic or isophthalic acids, with a glycol such as propylene glycol, ethylene glycol, diethylene glycol, neopentyl glycol or trimethyl pentanediol; polyether or polyester-derived polyurethanes; and polyamides such as polycaprolactam or those obtained by the condensation of hexamethylene-diamine with adipic or sebacic acid or the like. The present compounds are also useful stabilizers for natural rubber; halogenated rubber; conjugated diene polymers such as polybutadiene, copolymers of butadiene with styrene, acrylonitrile, acrylic acid, alkyl acrylates or methacrylates, methylvinyl ketone, vinyl pyridine and the like, polyisoprene or polychloroprene; vinyl polymers such as polyvinyl chloride, polyvinyl fluoride, polyvinylidene chloride, polyvinyl acetate, copolymers of vinyl chloride with vinylidene chloride, butadiene, styrene vinyl esters, α-β-olefinically unsaturated acids and esters thereof, α-β-olefinically unsaturated ketones and aldehydes and the like; homopolymers and copolymers of acrylic monomers such as acrylic acid, methacrylic acid, methyl acrylate, methyl methacrylate, ethyl acrylate, 2-ethylhexyl acrylate, acrylamide, methacrylamide, N-methylol acrylamide, acrylonitrile, methacrylonitrile or the like; polycarbonates, epoxy resins such as those obtained by the condensation of epichlorohydrin with bisphenols; epichlorohydrinethylene oxide or propylene oxide copolymers; and the like.

In addition to the above-mentioned polymeric organic materials the compositions may also be employed to stabilize organic non-polymeric materials. Such materials include waxes; synthetic- and petroleum-derived lubricating oils and greases; mineral oils such as fat, tallow, lard, cod liver oil and sperm oil, vegetable oils such as castor, linseed, peanut, palm, cotton seed or the like; fuel oil; diesel oil; gasoline; and the like.

The stabilized compositions herein disclosed are especially useful stabilizers for α-monoolefins, homopolymers and copolymers, polyacetal homopolymers and copolymers, polyamides, polyesters and polyurethanes, High and low density polyethylene, polypropylene, polyisobutylene and poly(4-methyl-1-pentene) have markedly improved resistance to oxidative, thermal and photochemical degradation when stabilizing amounts of the present compounds are incorporated therein. Ethylene-propylene copolymers and ethylene-propylene terpolymers containing less than about 10 percent by weight of a multiple unsaturated third monomer are also effectively stabilized with the polymer blends, that is, physical mixtures of two or more α-monoolefin copolymers or homopolymers are also stabilized in accordance with the present invention.

The following examples illustrate the invention more fully but are in nowise to be construed as a limitation of the scope thereof:

EXAMPLE 1

A polymer blend of 6.0 g. polypropylene (Hercules Profax 6501), 0.015g. (0.25 percent) 2,6-ditertiarybutyl-4-nonylphenol (containing 1 percent hydrazine hydrate) and 0.015 g. (0.25 percent) dilaurylthiodipropionate was prepared by adding to the polypropylene particles the stabilizers, 2,6-ditertiarybutyl-4-nonylphenol containing 1 percent hydrazine hydrate and dilaurylthiodipropionate in the form of their respective solutions in 8 ml acetone. After thorough mixing the acetone was allowed to evaporate leaving the polypropylene particles uniformly coated with the stabilizers. The last traces of acetone were removed under vacuum and the powder converted into 40 mil sheets by compression molding at 190°C. using a 6 inch × 6 inch laboratory Carver press. Small, 1-inch dumbell shapes were cut from the 40 mil sheets and aged in a circulating air oven provided with an insulated glass door for use in visually inspecting the samples at 150°C. Initial failure was determined as the point at which the samples had been exposed sufficiently long to develop micro surface cracks. Total failure was determined and represented as that point at which gentle tapping of the specimen caused it to break.

After aging for 52 hours, micro surface cracks were observed and total failure was produced only after 69 hours. No significant color change of the sample developed throughout this entire period.

EXAMPLE 2

The conventional polypropylene (Hercules Profax 6501) was compared with polypropylene stabilized with 2,6-ditertiarybutyl-4-nonylphenol, (containing 1 percent hydrazine hydrate) or dilaurylthiodipropionate or a combination of the two stabilizers. The recipes employed in these runs are set forth in Table 1 along with the test results:

TABLE 1

HEAT AGING PERFORMANCE OF POLYPROPYLENE (HERCULES PROFAX 6501) AT 150°C.

|  | Hours To Initial Failure | Hours To Total Failure |
|---|---|---|
| Polypropylene | 2 | 8 |
| Polypropylene + 0.1% 2,6-ditertiary-butyl-4-nonylphenol containing 1% by weight hydrazine hydrate | 2 | 24 |
| Polypropylene + 0.25% 2,6-ditertiary-butyl-4-nonylphenol | 4 | 24 |
| Polypropylene + 0.25% dilaurylthiodipropionate (DLTDP) | 18 | 36 |
| Polypropylene + .01% 2,6-ditertiary-butyl-4-nonylphenol containing 1% by weight hydrazine hydrate | 40 | 47 |
| Polypropylene + 0.25% 2,6-ditertiary-butyl-4-nonylphenol containing 1% by weight hydrazine hydrate + 0.25% DLTDP | 52 | 69 |

EXAMPLE 3

The ability of hydrazine hydrate to decolorize 2,6-ditertiarybutyl-4-nonylphenol, i.e., to limit the deep, red-brown color associated therewith was compared with several commercially available stabilizers and an unstabilized control The amounts of stabilizers employed are set forth in Table 2: along with the test results:

TABLE 2

EFFECT OF ADDITIVES ON BHNP COLOR*

| Additive | Amount Added Wt. % | Color After Storage | | |
|---|---|---|---|---|
| | | 16 hr. | 4 Days | 7 Days |
| Control | 0.0 | Red | — | — |
| Dimethylglyoxime | 0.2 | — | Red | — |
| Dimethylglyoxime | 0.4 | — | — | Yellow brown |
| Dicyclohexycabrodiimide | 0.1 | Deep red | — | — |
| Dicyclohexycabrodiimide | 0.2 | — | Brown | — |
| Dicyclohexycabrodiimide | 0.4 | — | — | Brown |
| Semicarbizidehydrochloride | 0.1 | Light red | — | — |
| Semicarbizidehydrochloride | 0.2 | — | Yellow | — |
| Semicarbizidehydrochloride | 0.4 | — | — | Yellow |
| Hydroxylaminehydrochloride | 0.1 | Light red | — | — |
| Hydroxylaminehydrochloride | 0.2 | — | Yellow | — |
| Hydroxylaminehydrochloride | 0.4 | — | — | Yellow |
| 4-Phenylsemicarbizide | 0.11 | Red | — | — |
| 4-Phenylsemicarbizide | 0.2 | — | Orange-red | — |
| 4-Phenylsemicarbizide | 0.4 | — | — | Orange |
| Acetone oxime | 0.1 | Deep red | — | — |
| Acetone oxime | 0.2 | — | Brown | — |
| Acetone oxime | 0.4 | — | — | Yellow-brown |
| Dicyandiamide | 0.1 | Red | — | — |
| Dicyandiamide | 0.2 | — | Yellow | — |
| Dicyandiamide | 0.4 | — | — | Yellow-brown |
| Hydrazine hydrate | 0.1 | Pale red | — | — |
| Hydrazine hydrate | 0.2 | — | v. pale yellow | — |
| Hydrazine hydrate | 0.4 | — | — | Colorless |
| Triphenyl phosphite | 0.2 | Brown | — | — |
| Sodium hydroxide | 0.2 | Brown | — | — |
| Ethylenediamine | 0.2 | Brown | — | — |

*Original color was a very dark red-brown

The results demonstrate that of the various reagents tested including a number of reagents capable of removing quinone-type impurities by hydrazone formation only hydrazine resulted in a completely water-white product. While a number of the reagents did lighten the color from a deep brown to a yellow or yellow-brown, a colorless product was in no instance prepared.

We claim:

1. A composition for stabilizing organic polymers against the deleterious effects of oxygen, heat and light comprising a substantially colorless mixture of hydrazine or hydrazine hydrate and a hindered alkyl phenol having the following formula:

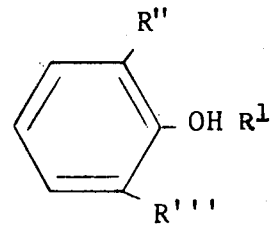

wherein R' is alkyl containing up to 24 carbon atoms or an aliphatic aryl group having the formula:

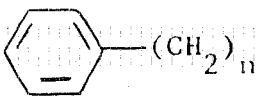

wherein n has a value of from 1 to 10; R'' is t-butyl t-amyl or isopropyl and R''' is the same as R'' or ethyl, propyl, butyl, amyl or hydrogen.

2. Composition according to claim 1 wherein there is additionally present a diester of β-thiodipropionate having the following formula: ROOCCH$_2$CH$_2$—S—CH$_2$CH$_2$COOR, wherein R is an alkyl group containing from 6–20 carbon atoms.

3. Composition according to claim 1 wherein said phenol is 2,6-ditertiarybutyl-4-nonylphenol.

4. Composition according to claim 2 wherein said diester of β-thiodipropionic acid is dilaurylthiodipropionate.

5. Composition according to claim 4 wherein said diester of β-thiodipropionic acid is dilaurylthiodipropionate.

6. The composition according to claim 1 wherein said hydrazine or hydrazine hydrate is present in an amount of from 0.1 to 5 percent by weight of the hindered phenol.

7. The composition of claim 1 wherein the phenol is 2,6-ditertiarybutyl-4-nonyl phenol and is in admixture with hydrazine hydrate.

8. The composition of claim 7 wherein the composition additionally contains dilaurylthiodipropionate.

* * * * *